United States Patent
Chen

(10) Patent No.: US 12,072,832 B2
(45) Date of Patent: Aug. 27, 2024

(54) APPARATUS AND METHODS FOR HIGH-SPEED DRIVERS

(71) Applicant: Analog Devices, Inc., Wilmington, MA (US)

(72) Inventor: Wei-Hung Chen, Millburn, NJ (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 18/190,468

(22) Filed: Mar. 27, 2023

(65) Prior Publication Data

US 2023/0229620 A1 Jul. 20, 2023

Related U.S. Application Data

(62) Division of application No. 17/450,585, filed on Oct. 12, 2021, now Pat. No. 11,640,367.

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
CPC ...... G06F 13/4282; H04B 1/04; H03K 5/1565
See application file for complete search history.

(56) References Cited

U.S. PATENT DOCUMENTS

| | | | |
|---|---|---|---|
| 4,611,135 A | 9/1986 | Nakayama et al. | |
| 6,198,674 B1 | 3/2001 | Kim | |
| 7,688,120 B2 | 3/2010 | Kim | |
| 7,848,724 B2 | 12/2010 | Bult et al. | |
| 7,880,521 B2 | 2/2011 | Okamura et al. | |
| 8,030,968 B1 | 10/2011 | Avner et al. | |
| 8,497,707 B2 | 7/2013 | Liu et al. | |

(Continued)

FOREIGN PATENT DOCUMENTS

JP  6127828 B2  5/2017

OTHER PUBLICATIONS

Bulzacchelli et al., "A 28-GB/s 4-Tap FFE/15-Tap DFE Serial Link Transceiver in 32-nm SOI CMOS Technology" IEEE Journal of Solid-State Circuits, vol. 47, No. 12, Dec. 2012, in 18 pages.

(Continued)

*Primary Examiner* — Phong H Dang
(74) *Attorney, Agent, or Firm* — Knobbe, Martens, Olson & Bear, LLP

(57) ABSTRACT

Apparatus and methods for high-speed drivers are provided herein. In certain embodiments, a high-speed driver multiplexes two or more data streams. The high-speed driver is implemented with a mux-then-driver topology that provides multiplexing in a predriver circuit. Thus, the multiplexer is eliminated from the full rate output path to relax timing. Driver amplitude control schemes are also disclosed in which a controllable driver includes a group of differential series source transistor (SST) driver slices that are connected in parallel with one another to drive a pair of output terminals, and a group of attenuator slices that are connected in parallel with one another across the pair of output terminals. Additionally, the controllable driver includes a control circuit that activates an attenuator slice for each SST driver slice that is decommissioned to provide output amplitude control.

20 Claims, 15 Drawing Sheets

(56) References Cited

U.S. PATENT DOCUMENTS

| | | | |
|---|---|---|---|
| 8,937,490 B2 | 1/2015 | Moon et al. | |
| 8,994,412 B2 | 3/2015 | Kim | |
| 9,071,293 B1* | 6/2015 | Venditti | H04B 1/0475 |
| 9,843,324 B1* | 12/2017 | Hafizi | H03K 19/017545 |
| 9,998,305 B2 | 6/2018 | Zerbe et al. | |
| 10,205,614 B2 | 2/2019 | Zerbe et al. | |
| 10,530,617 B2 | 1/2020 | Lin | |
| 10,791,008 B2 | 9/2020 | Ulrich | |
| 10,812,297 B2 | 10/2020 | Zerbe et al. | |
| 11,012,074 B1* | 5/2021 | Wu | G11C 29/022 |
| 11,640,367 B1 | 5/2023 | Chen | |
| 2004/0258166 A1 | 12/2004 | Camara et al. | |
| 2009/0079484 A1* | 3/2009 | Sumesaglam | H04L 25/028 327/161 |
| 2012/0280723 A1 | 11/2012 | Scott et al. | |
| 2013/0101056 A1* | 4/2013 | Ahn | H03F 3/2171 375/295 |
| 2013/0135006 A1 | 5/2013 | Menolfi et al. | |
| 2013/0335120 A1 | 12/2013 | Bergkvist et al. | |
| 2015/0145707 A1 | 5/2015 | Jeong et al. | |
| 2016/0149577 A1* | 5/2016 | Abdul-Latif | H03K 19/018514 327/108 |
| 2016/0156323 A1 | 6/2016 | Nasu et al. | |
| 2016/0300546 A1 | 10/2016 | Zheng et al. | |
| 2018/0131339 A1 | 5/2018 | Ye et al. | |
| 2020/0412368 A1 | 12/2020 | Den Besten et al. | |
| 2022/0231686 A1* | 7/2022 | Lee | H03K 19/018521 |

OTHER PUBLICATIONS

Kim et al., "A 112 GB/s PAM-4 56 GB/s NRZ Reconfigurable Transmitter With Three-Tap FFE in 10-nm FinFET" IEEE Journal of Solid-State Circuits, vol. 54, No. 1, Jan. 2019, in 14 pages.

Peng et al., "A 100Gb/s NRZ Transmitter with 8-Tap FFE Using a 7b DAC in 40nm CMOS" 2020 IEEE ISSCC dated Feb. 17, 2020, in 3 pages.

* cited by examiner

APPARATUS AND METHODS FOR HIGH-SPEED DRIVERS

CROSS REFERENCE TO RELATED APPLICATIONS

This application is a divisional of U.S. patent application Ser. No. 17/450,585, filed on Oct. 12, 2021, which is hereby incorporated by reference in its entirety.

FIELD OF THE DISCLOSURE

Embodiments of the invention relate to electronics, and more particularly, to driver circuits for high-speed communications.

BACKGROUND

Serializer/deserializer (SerDes) systems can be used in a variety of applications such as telecommunications, optical networks, and/or chip-to-chip communication.

A SerDes system includes a serializer that converts two or more parallel input data streams into a high-speed serial data stream, and a deserializer that converts the high-speed serial data stream into two or more parallel output data streams of reduced speed. Thus, data transmission can be provided over a reduced number of lines to lower pin count.

SUMMARY OF THE DISCLOSURE

Apparatus and methods for high-speed drivers are provided herein. In certain embodiments, a high-speed driver multiplexes two or more data streams. The high-speed driver is implemented with a mux-then-driver topology that provides multiplexing in a predriver circuit. Thus, the multiplexer is eliminated from the full rate output path to relax timing. Driver amplitude control schemes are also disclosed in which a controllable driver includes a group of differential series source transistor (SST) driver slices that are connected in parallel with one another to drive a pair of output terminals, and a group of attenuator slices that are connected in parallel with one another across the pair of output terminals. Additionally, the controllable driver includes a control circuit that activates an attenuator slice for each SST driver slice that is decommissioned to provide output amplitude control.

In one aspect, a driver circuit includes an output terminal configured to provide an output data stream, and a first driver subcircuit configured to receive a first input data stream of a lower bit rate than the output data stream, and to drive the output terminal based on the first input data stream in response to a transition of a first clock signal. The first driver subcircuit includes a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor.

In another aspect, a SerDes system includes a deserializer, and a serializer including a driver. The driver includes an output terminal configured to provide an output data stream to the deserializer, and a first driver subcircuit configured to receive a first input data stream of a lower bit rate than the output data stream, and to drive the output terminal based on the first input data stream in response to a transition of a first clock signal. The first driver subcircuit includes a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor.

In another aspect, a method of multiplexing data streams is provided. The method includes providing an output data stream on an output terminal, receiving a first input data stream of a lower bit rate than the output data stream as an input to a first driver subcircuit, and driving the output terminal based on the first input data stream in response to a transition of a first clock signal using the first driver subcircuit, including controlling a first driver transistor connected between a high supply voltage and the output terminal with no other transistors therebetween using a first pull-up predriver, and controlling a second driver transistor connected between a low supply voltage and the output terminal with no other transistors therebetween using a first pull-down predriver.

In another aspect, a driver circuit includes a pair of output terminals configured to provide a differential output signal, a plurality of differential series source transistor (SST) driver slices electrically connected in parallel with one another and configured to drive the pair of output terminals, a plurality of attenuator slices connected in parallel with one another across the pair of output terminals, and a control circuit configured to selectively deactivate one or more of the differential SST driver slices to control an amplitude of the differential output signal, and to enable a corresponding number of the attenuator slices to provide output impedance compensation.

In another aspect, a method of output swing control in a driver circuit is provided. The method includes providing a differential output signal on a pair of output terminals, driving the pair of output terminals using a plurality of differential series source transistor (SST) driver slices electrically connected in parallel with one another, deactivating one or more of the differential SST driver slices to control an amplitude of the differential output signal, and enabling a corresponding number of a plurality of attenuator slices to provide output impedance compensation, wherein the plurality of attenuator slices are connected in parallel with one another across the pair of output terminals.

In another aspect, a serializer/deserializer (SerDes) system includes a deserializer, and a serializer comprising a driver including a pair of output terminals configured to provide a differential output signal to the deserializer, a plurality of differential series source transistor (SST) driver slices electrically connected in parallel with one another and configured to drive the pair of output terminals, a plurality of attenuator slices connected in parallel with one another across the pair of output terminals, and a control circuit configured to selectively deactivate one or more of the differential SST driver slices to control an amplitude of the differential output signal, and to enable a corresponding number of the attenuator slices to provide output impedance compensation.

DETAILED DESCRIPTION OF EMBODIMENTS

Figure 1A:
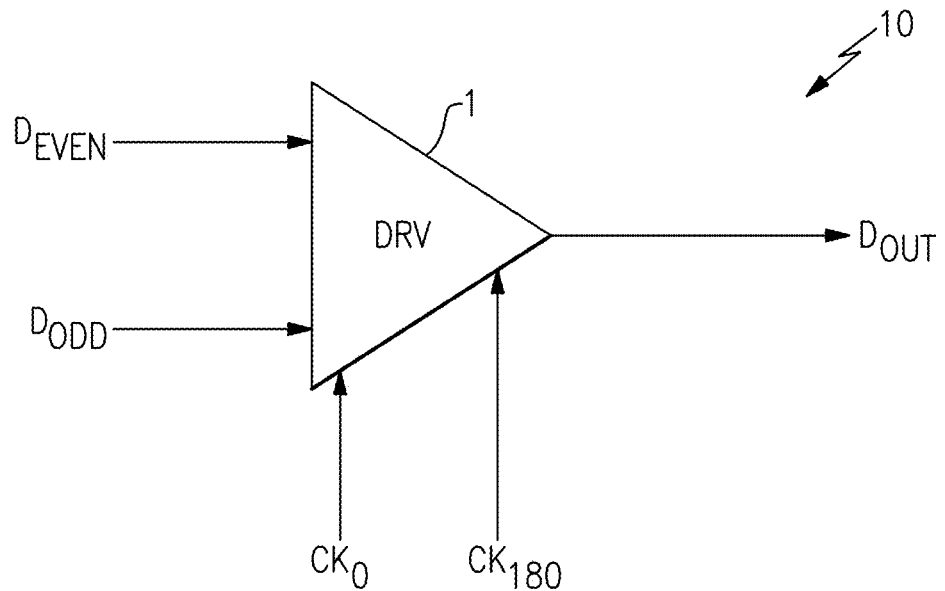
FIG. 1A is a schematic diagram of one embodiment of a multiplexing driver.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A SerDes system can include a serializer that generates a high-speed serial data stream based on data streams associated with different time offsets or delays. For instance, in a half rate SerDes system, a serializer can combine a first half rate data stream and a second half rate data stream into a full rate data stream having a bit period, with the second half rate data stream delayed by the bit period relative to the first half rate data stream.

In certain embodiments herein, high-speed drivers for multiplexing two or more data streams are provided. The high-speed driver is implemented with a mux-then-driver topology that provides multiplexing in a predriver circuit. Thus, the multiplexer is eliminated from the full rate output path to relax timing. For example, in an implementation with two data streams, a timing constraint is relaxed by a factor of two.

Moreover, implementing the multiplexer in the predriver reduces a size of the multiplexing transistors relative to an implementation in which an explicit T-gate multiplexer is included along the output signal path. By reducing the size of the multiplexing transistors, the multiplexer size is shrunk and the total capacitance is reduced to achieve reduced power and a tighter output eye diagram.

Figure 1B:
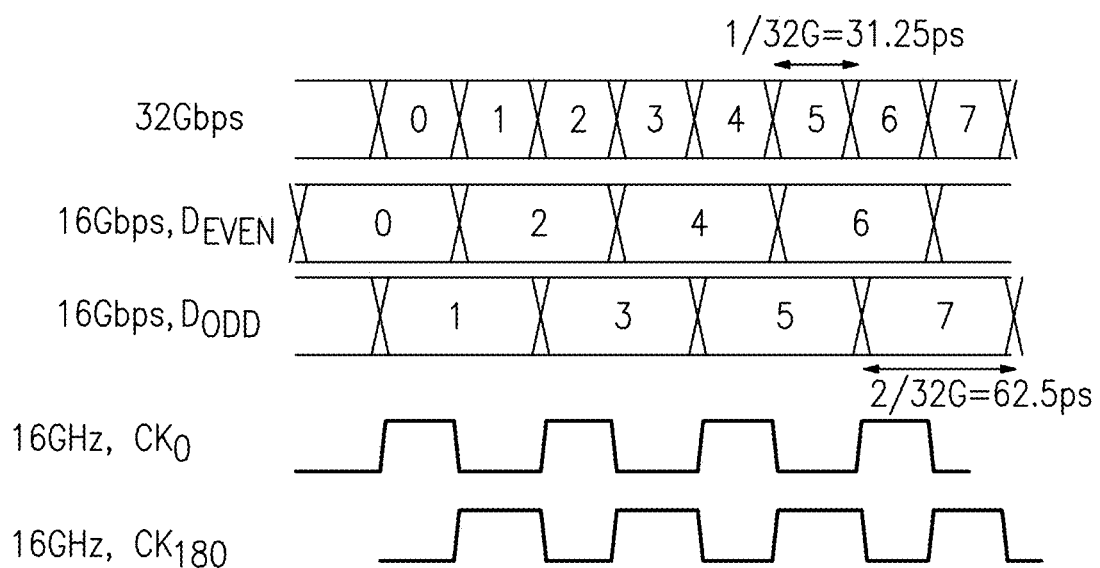
FIG. 1B is one example of a timing diagram for the multiplexing driver of FIG. 1A.

FIG. 1A is a schematic diagram of one embodiment of a multiplexing driver 10. FIG. 1B is one example of a timing diagram for the multiplexing driver 10 of FIG. 1A.

With reference to FIG. 1A, the multiplexing driver 10 operates to multiplex an odd half rate data stream $D_{ODD}$ (also referred to herein as an odd data stream) and an even half rate data stream $D_{EVEN}$ (also referred to herein as an even data stream) to generate a full rate data stream $D_{OUT}$. Thus, the multiplexing driver 10 provides two-way interleaving.

The multiplexing driver 10 receives the odd data stream $D_{ODD}$ and the even data stream $D_{EVEN}$, as well as a first clock signal $CK_0$ and a second clock signal $CK_{180}$ used for controlling timing of the data streams. In the example of FIG. 1B, the value of the odd data stream $D_{ODD}$ becomes ready at the input of the multiplexing driver 10 before a rising edge of the first clock signal $CK_0$, and the value is transferred to the full rate data stream Dour in response to a rising edge of the second clock signal $CK_{180}$. Additionally, the value of the even data stream $D_{EVEN}$ becomes ready at the input of the multiplexing driver 10 before a rising edge of the second clock signal $CK_{180}$, and the value is transferred to the full rate data stream $D_{OUT}$ in response to a rising edge of the first clock signal $CK_0$.

In the example of FIG. 1B, annotations for an example full data rate of 32 gigabits per second (Gbps) are depicted. In this example, the half rate data streams operate at 16 Gbps and a corresponding bit interval of 62.5 picoseconds (ps), while the full rate data stream has a 31.25 ps bit interval. The first clock signal $CK_0$ and the second clock signal $CK_{180}$ operate at 16 gigahertz (GHz) with a bit period offset from one another.

When operating at a full data rate of 32 Gbps, the 31.25 ps bit period approaches the process limit for certain processes, such as 16 nanometer (nm) processes associated with an inverter fan-out two delay of about 5 ps.

To implement the multiplexing driver 10, the odd data stream $D_{ODD}$ could be provided to a first inverter that drives a first T-gate multiplexer, and the even data stream $D_{EVEN}$ could be provided to a second inverter that drives a second T-gate multiplexer. Additionally, the first T-gate multiplexer could pass the odd data stream $D_{ODD}$ to the output based on timing of the second clock signal $CLK_{180}$ (for instance, in response to a rising edge), while the second T-gate multiplexer could pass the even data stream $D_{EVEN}$ to the output based on timing of the first clock signal $CLK_0$ (for instance, in response to a rising edge).

However, such an implementation has high output resistance due to a T-gate multiplexer being in series with each driver inverter. Furthermore, a large T-gate multiplexer size (to keep the output resistance low due to the series combination of transistors) results in high parasitic capacitance. Moreover, including a series output resistor for impedance matching (for instance, 50 Ohm) can further raise output resistance and slow timing. Furthermore, asymmetries in the logic gates used to drive the T-gate multiplexers leads to imbalances in rise/fall times and a data eye that is bimodal.

In certain embodiments herein, the multiplexing driver 10 is implemented using a mux-then-driver topology that provides multiplexing in a predriver circuit. Thus, the multiplexer is eliminated from the full rate output path, thereby relaxing timing constraints to allow handling of data streams of higher bit rates.

Figure 2A:
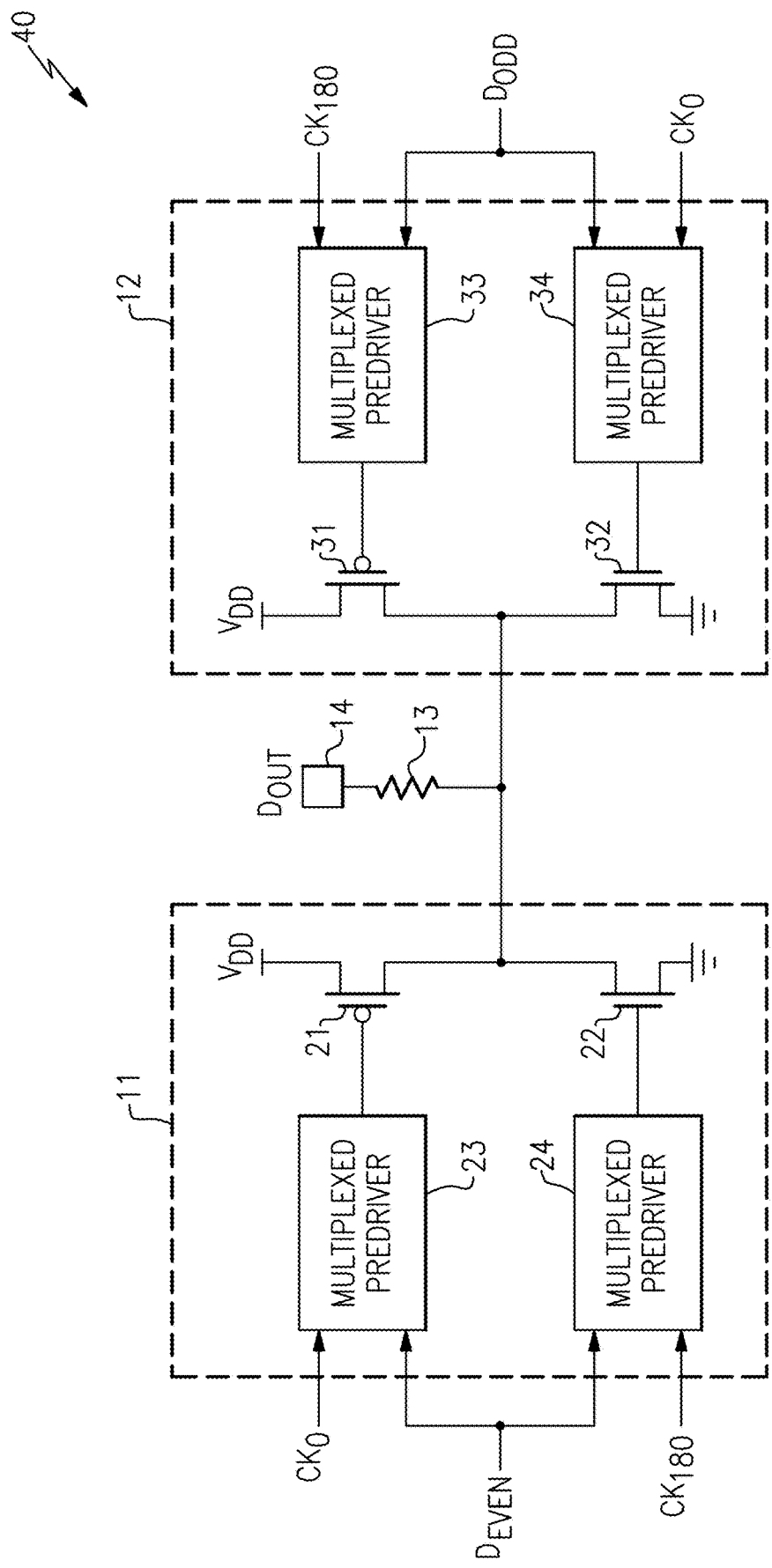
FIG. 2A is a schematic diagram of another embodiment of a multiplexing driver.

FIG. 2A is a schematic diagram of another embodiment of a multiplexing driver 40. The multiplexing driver 40 includes a first driver half circuit 11, a second driver half circuit 12, an output resistor 13, and an output pin or pad 14.

As shown in FIG. 2A, the first driver half circuit 11 receives the even data stream $D_{EVEN}$, the first clock signal $CK_0$, and the second clock signal $CK_{180}$, while the second driver half circuit 12 receives the odd data stream $D_{ODD}$, the first clock signal $CK_0$, and the second clock signal $CK_{180}$. The first driver half circuit 11 operates to provide the even data stream $D_{EVEN}$ to the output pad 14 based on timing of the first clock signal $CK_0$ (for instance, in response to a rising edge), while the second driver half circuit 12 operates to provide the odd data stream $D_{ODD}$ to the output pad 14 based on timing of the second clock signal $CK_{180}$ (for instance, in response to a rising edge).

Thus, the first driver half circuit 11 and the second driver half circuit 12 operate in an alternating or ping-pong sequence.

The first driver half circuit 11 and the second driver half circuit 12 each include an output connected to the output pad 14 by way of the output resistor 13. Including the output resistor 13 can aid in achieving a desired output impedance match, for instance, 50 Ohms or other desired output impedance value. The output resistor 13 can be implemented in a wide variety of ways including, but not limited to, using polysilicon or other resistive material having a geometry selected to achieve a target resistance value. In certain implementations, the output resistor 13 is trimmable and/or otherwise controllable to achieve an output resistance that provides compensation for variation.

In the illustrated embodiment, the first driver half circuit 11 includes a first driver p-type field effect transistor (PFET) 21, a first driver n-type field effect transistor (NFET) 22, a first pull-up predriver circuit 23, and a first pull-down predriver circuit 24. Additionally, the second driver half circuit 12 includes a second driver PFET 31, a second driver NFET 32, a second pull-up predriver circuit 33, and a second pull-down predriver circuit 34. The predriver circuits are implemented with multiplexing in accordance with the teachings herein.

Accordingly, the multiplexing driver 40 is advantageously implemented with multiplexing that is implemented in predriver stages, thereby allowing a connection to the output pad 14 that goes through a low number of transistors.

For example, as shown in FIG. 2A, the first driver half circuit 11 can drive the output pad 14 logically high using the first driver PFET 21, which is connected in series with the output resistor 13 between a power supply voltage $V_{DD}$ (also referred to herein as a high supply voltage) and the output pad 14 with no other transistors therebetween. Likewise, the first driver half circuit 11 can drive the output pad 14 logically low using the first driver NFET 22, which is connected in series with the output resistor 13 between a ground voltage (also referred to herein as a low supply voltage or $V_{SS}$) and the output pad 14 with no other transistors therebetween.

Accordingly, timing constraints are relaxed by eliminating a multiplexer (for instance, a T-gate multiplexer in cascade with a driver inverter) from the output resistance path.

The NFETs and PFETs can be implemented in a wide variety of ways. In one example, the multiplexing driver 40 is fabricated in a complementary metal oxide semiconductor (CMOS) process, and the NFETs correspond to n-type metal oxide semiconductor (NMOS) transistors while the PFETs correspond to p-type metal oxide semiconductor (PMOS) transistors.

Figure 2B:
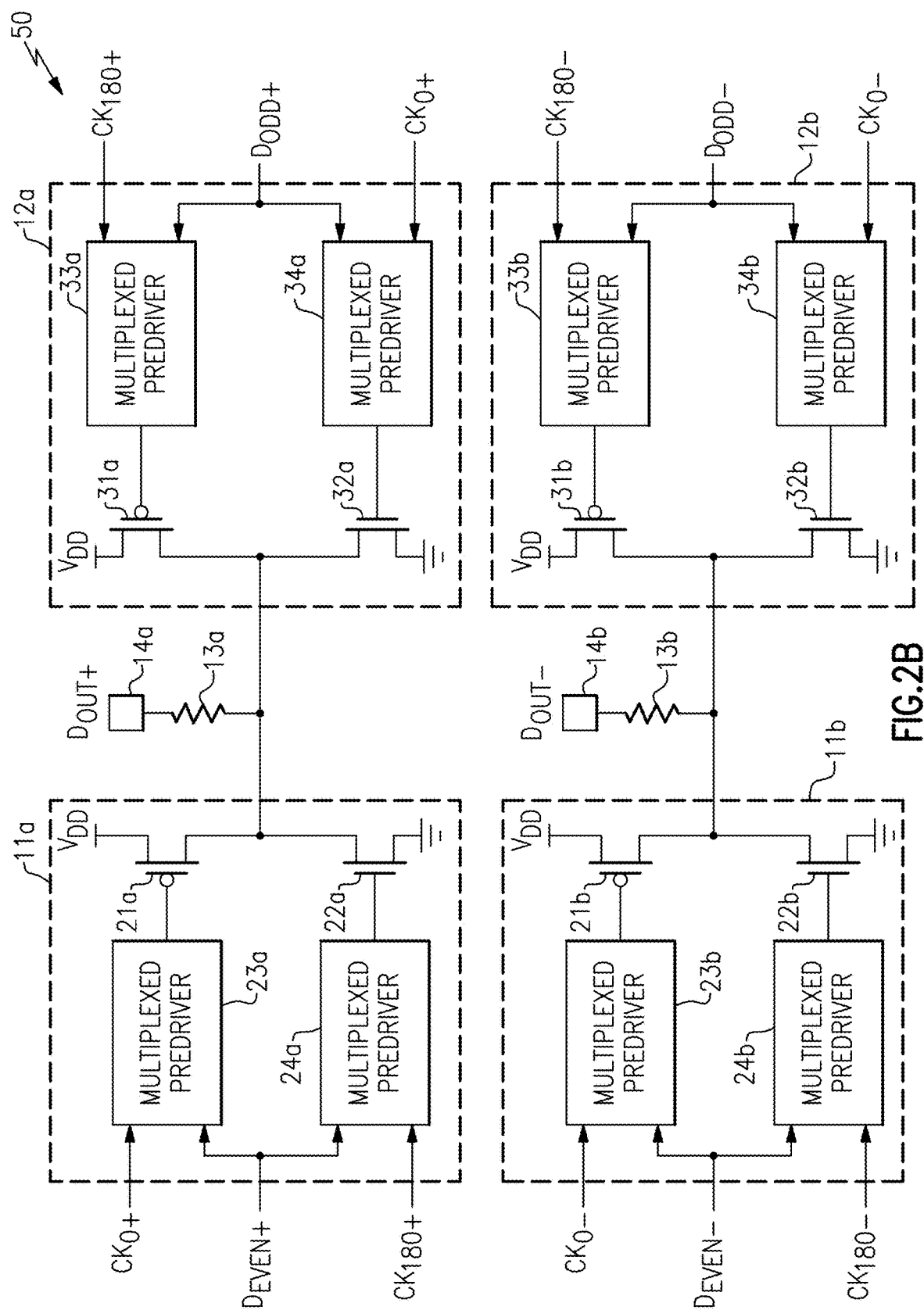
FIG. 2B is a schematic diagram of another embodiment of a multiplexing driver.

FIG. 2B is a schematic diagram of another embodiment of a multiplexing driver 50. The multiplexing driver 50 of FIG. 2B is similar to the multiplexing driver 40 of FIG. 2A, except that the multiplexing driver 50 is implemented in a differential configuration.

For example, the multiplexing driver 50 includes a first non-inverted (+) driver half circuit 11a, a second non-inverted driver half circuit 12a, a first output resistor 13a, and a first output pad 14a. The first non-inverted driver half circuit 11a operates to provide the non-inverted even data stream $D_{EVEN+}$ to the first output pad 14a (which provides $D_{OUT+}$) based on timing of the first non-inverted clock signal $CK_0+$, while the second non-inverted driver half circuit 12a operates to provide the non-inverted odd data stream $D_{ODD+}$ to the first output pad 14a based on timing of the second non-inverted clock signal $CK_{180+}$. The first non-inverted driver half circuit 11a includes a first driver PFET 21a, a first driver NFET 22a, a first pull-up predriver circuit 23a, and a first pull-down predriver circuit 24a, while the second non-inverted driver half circuit 12a includes a second driver PFET 31a, a second driver NFET 32a, a second pull-up predriver circuit 33a, and a second pull-down predriver circuit 34a.

With continuing reference to FIG. 2B, the first inverted driver half circuit 11b operates to provide the inverted even data stream $D_{EVEN-}$ to the second output pad 14b (which provides $D_{OUT-}$) based on timing of the first inverted clock signal $CK_{0-}$, while the second inverted driver half circuit 12b operates to provide the inverted odd data stream $D_{ODD-}$ to the second output pad 14b based on timing of the second inverted clock signal $CK_{180-}$. The first inverted driver half circuit 11b includes a first driver PFET 21b, a first driver NFET 22b, a first pull-up predriver circuit 23b, and a first pull-down predriver circuit 24b, while the second inverted driver half circuit 12b includes a second driver PFET 31b, a second driver NFET 32b, a second pull-up predriver circuit 33b, and a second pull-down predriver circuit 34b.

Any of the driver circuits herein can be implemented differentially. By implementing a multiplexing predriver differentially, enhanced immunity against common-mode noise can be achieved.

Figure 3A:
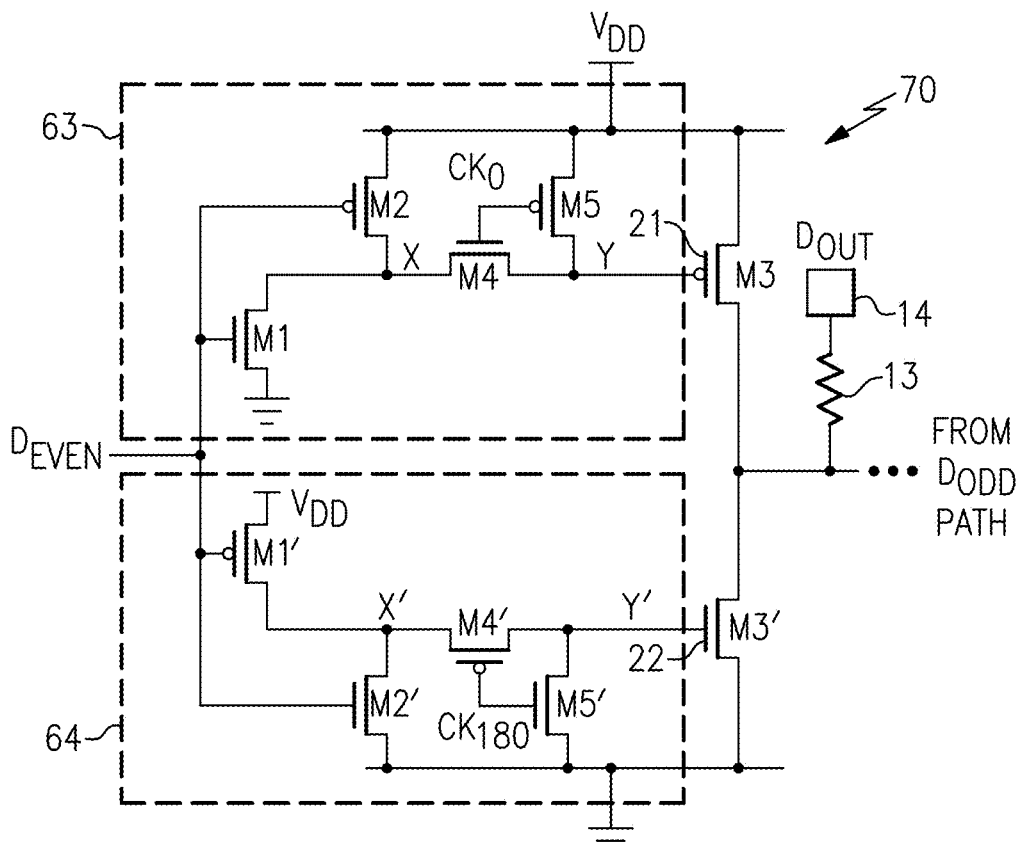
FIG. 3A is a schematic diagram of one embodiment of a driver half circuit for a multiplexing driver.
Figure 3B:
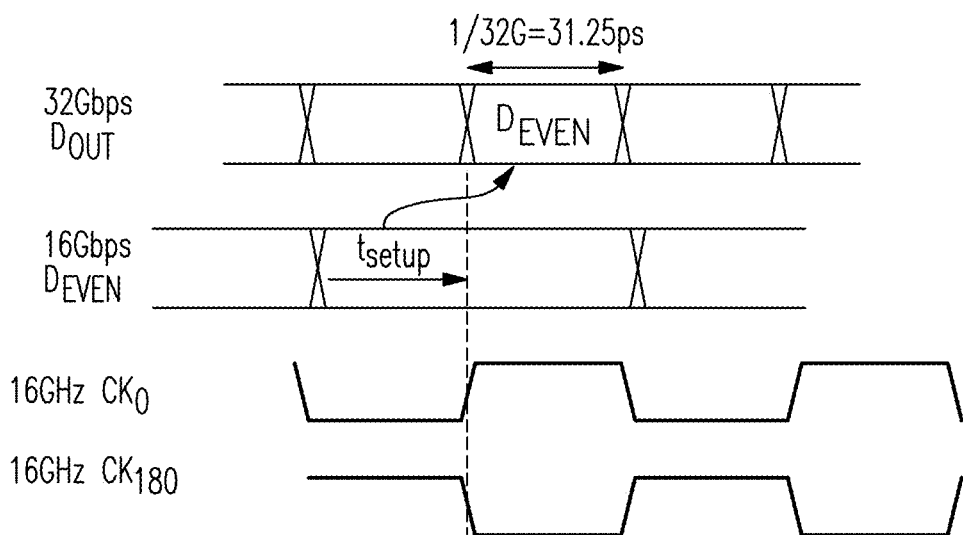
FIG. 3B is one example of a timing diagram for the driver half circuit of FIG. 3A.

FIG. 3A is a schematic diagram of one embodiment of a driver half circuit 70 for a multiplexing driver. For example, the driver half circuit 70 can connect to an output resistor 13 and an output pad 14 of the multiplexing driver as shown. FIG. 3B is one example of a timing diagram for the driver half circuit 70 of FIG. 3A when operating at 32 Gbps.

As shown in FIG. 3A, the driver half circuit 70 receives the even data stream $D_{EVEN}$, the first clock signal $CK_0$, and the second clock signal $CK_{180}$. The driver half circuit 70 includes a driver PFET 21 (also referred to as driver PFET M3), a driver NFET 22 (also referred to as driver NFET M3'), a pull-up predriver circuit 63, and a pull-down predriver circuit 64.

In the illustrated embodiment, the pull-up predriver circuit 63 includes a pull-down data NFET M1, a pull-up data PFET M2, a multiplexing NFET M4, and a pre-charge PFET M5. As shown in FIG. 3A, the pull-up predriver circuit 63 controls activation of the driver PFET M3 at a node Y that is pre-charged to $V_{DD}$ by the pre-charge PFET M5 when the first clock signal $CK_0$ is low. Additionally, the pull-up data PFET M2 and the pull-down data NFET M1 control the node X to one of $V_{DD}$ or ground ($V_{SS}$) based on a state of the even data stream $D_{EVEN}$. In response to the first clock signal $CK_0$ going high, the multiplexing NFET M4 passes the value of node X to node Y to thereby control the driver PFET M3.

With continuing reference to FIG. 3A, the pull-down predriver circuit 64 includes a pull-up data PFET M1', a pull-down data NFET M2', a multiplexing PFET M4', and a pre-charge NFET M5'. As shown in FIG. 3A, the pull-down predriver circuit 64 controls activation of the driver NFET M3' at a node Y' that is pre-charged to ground by the pre-charge NFET M5' when the second clock signal $CK_{180}$ is high. Additionally, the pull-up data PFET M1' and the pull-down data NFET M2' control the node X' to one of $V_{DD}$ or ground based on a state of the even data stream $D_{EVEN}$. In response to the second clock signal $CK_{180}$ going low, the multiplexing PFET M4' passes the value of node X' to node Y' to thereby control the driver MFET M3'.

Thus, the pull-up predriver circuit 63 and the pull-down predriver circuit 64 operate in a first phase associated with pre-charge followed by a second phase in which the output is pulled up or down based on a state of the even data stream $D_{EVEN}$.

By implementing the driver half circuit 70 in this manner, a number of performance enhancements are achieved including, but not limited to, a relaxed setup time ($t_{setup}$).

Table 1 below provides a summary of operation of the pull-up predriver circuit 63 over the first phase and the second phase.

TABLE 1

| Phase | $CK_0$ | $CK_{180}$ | $D_{EVEN}$ | node Y | M4 | M5 |
|---|---|---|---|---|---|---|
| 1 | Low | high | settling | pre-charge to $V_{DD}$ | off | on |
| 2 | High | low | transparent | pull-down when $D_{EVEN} = 1$ | on | off |

Figure 4A:
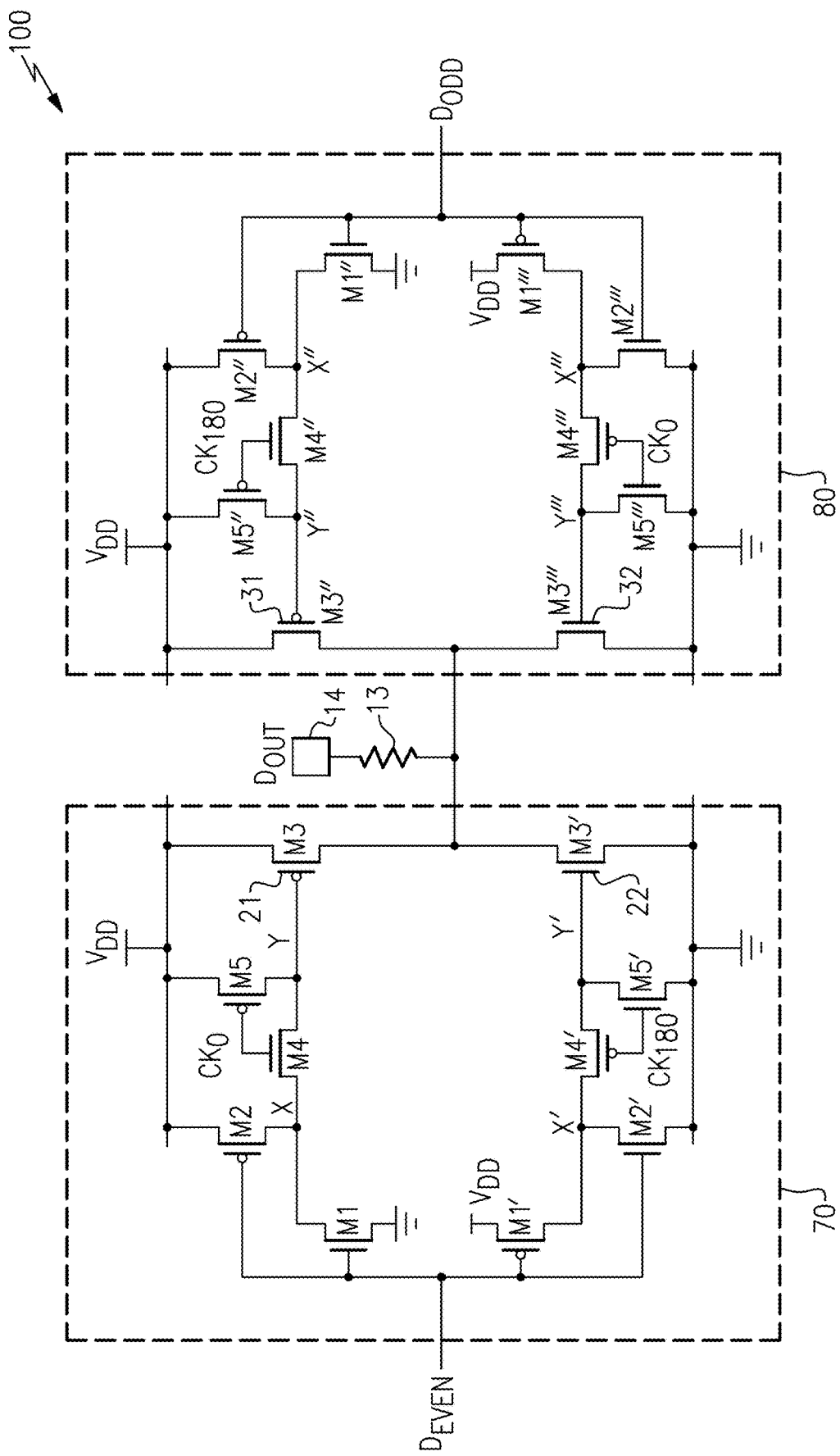
FIG. 4A is a schematic diagram of another embodiment of a multiplexing driver.
Figure 4B:
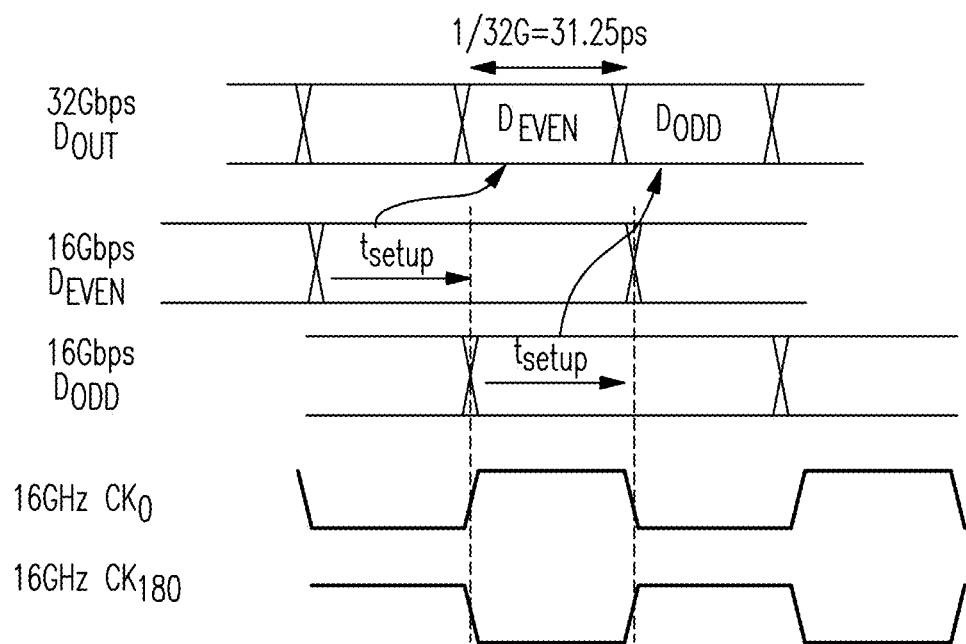
FIG. 4B is one example of a timing diagram for the multiplexing driver of FIG. 4A.

FIG. 4A is a schematic diagram of another embodiment of a multiplexing driver 100. FIG. 4B is one example of a timing diagram for the multiplexing driver 100 of FIG. 4A when operating at 32 Gbps. The multiplexing driver 100 includes a first driver half circuit 70, a second driver half circuit 80, an output resistor 13, and an output pad 14.

The multiplexing driver 100 includes two half driver circuits implemented in accordance with the embodiment of FIG. 3A. For example, the multiplexing driver 100 includes the first half driver circuit 70, as described earlier with respect to FIG. 3A. The multiplexing driver 100 further includes the second half driver circuit 80 used to control the output data stream Dour based on the odd data stream $D_{ODD}$ and timing of the first clock signal $CK_0$ and the second clock signal $CK_{180}$.

As shown in FIG. 4A, the second half driver circuit 80 includes a pull-down data NFET M1" (for pulling down node X" when $D_{ODD}$ is high), a pull-up data PFET M2", a driver PFET M3", a multiplexing NFET M4" (controlled by $CK_{180}$), a pre-charge PFET M5" (for pre-charging node Y" to $V_{DD}$ when $CK_{180}$ is low), a pull-up data PFET M1''' (for pulling up node X''' when $D_{ODD}$ is low), a pull-down data NFET M2''', a multiplexing PFET M4''' (controlled by $CK_0$), and a pre-charge NFET M5''' (for pre-charging node Y''' to ground when $CK_0$ is high).

Figure 5A:
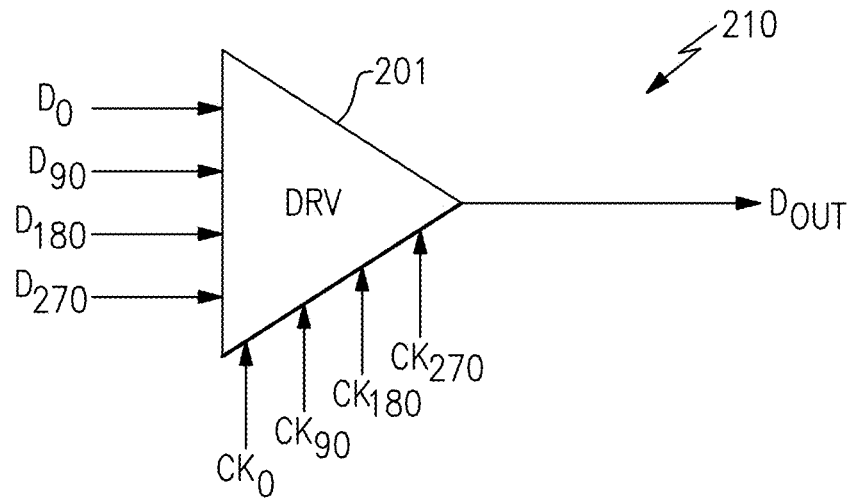
FIG. 5A is a schematic diagram of another embodiment of a multiplexing driver.
Figure 5B:
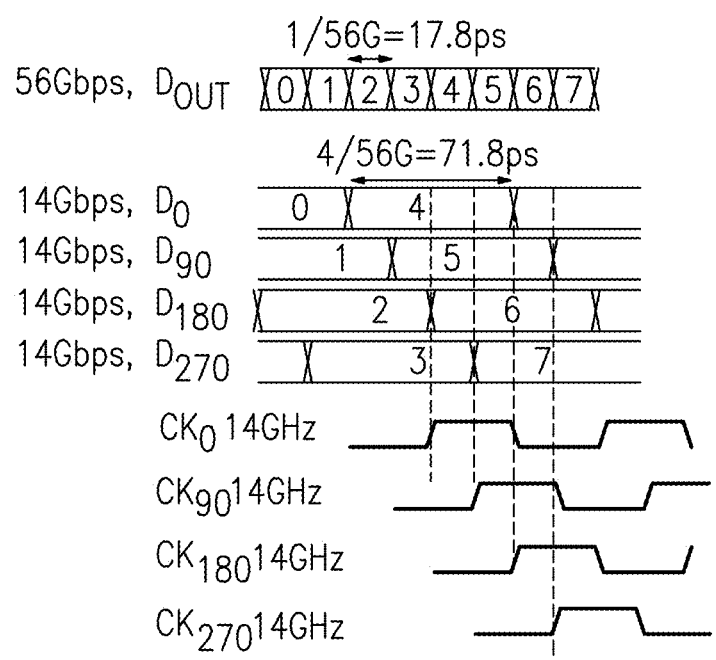
FIG. 5B is one example of a timing diagram for the multiplexing driver of FIG. 5A.

FIG. 5A is a schematic diagram of another embodiment of a multiplexing driver 210. FIG. 5B is one example of a timing diagram for the multiplexing driver 210 of FIG. 5A.

With reference to FIG. 5A, the multiplexing driver 210 generates a full rate data stream Dour by multiplexing a first quarter rate data stream $D_0$, a second quarter rate data stream $D_{90}$, a third quarter rate data stream $D_{180}$, and a fourth quarter rate data stream $D_{270}$. Thus, the multiplexing driver 210 provides four-way interleaving.

In addition to receiving the quarter rate data streams, the multiplexing driver 210 receives a first clock signal $CK_0$, a second clock signal $CK_{90}$, a third clock signal $CK_{180}$, and a fourth clock signal $CK_{270}$ that are offset in phase from one another (by a bit interval of $D_{OUT}$).

In the example of FIG. 5B, annotations for operation at a full data rate of 56 Gbps are depicted. In this example, the quarter rate data streams operate at 14 Gbps and a corresponding bit interval of 71.8 ps, while the full rate data stream has a 17.8 ps bit interval. Furthermore, the clock signals operate at a 14 GHz with a bit period offset from one another.

By providing 4-way interleaving, higher output data rate can be achieved relative to 2-way interleaving or no interleaving.

In certain embodiments herein, the multiplexing driver 210 is implemented using a mux-then-driver topology that provides multiplexing in a predriver circuit. Thus, the multiplexer is eliminated from the full rate output path to relax timing constraints.

Figure 6:
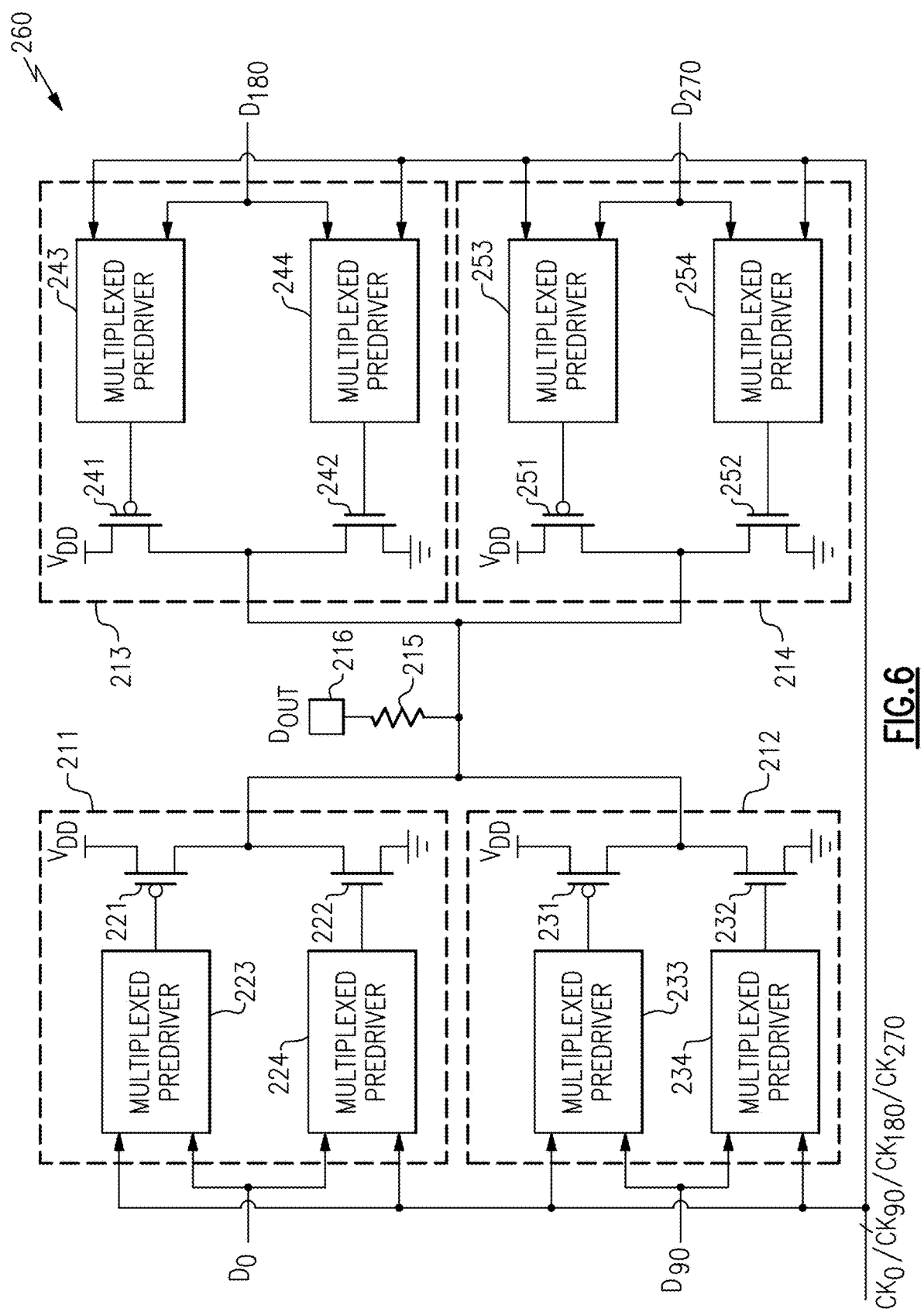
FIG. 6 is a schematic diagram of another embodiment of a multiplexing driver.

FIG. 6 is a schematic diagram of another embodiment of a multiplexing driver 260. The multiplexing driver 260 includes a first driver quarter circuit 211, a second driver quarter circuit 212, a third driver quarter circuit 213, a fourth driver quarter circuit 214, an output resistor 215, and an output pin or pad 216.

As shown in FIG. 6, the first driver quarter circuit 211 receives the first data stream Do, the second driver quarter circuit 212 receives the second data stream $D_{90}$, the third driver quarter circuit 213 receives the third data stream $D_{180}$, and the fourth driver quarter circuit 214 receives the fourth data stream $D_{270}$. The driver quarter circuits 211-214 are interleaved to drive the output pad 216 with their respective data streams based on timing of the first clock signal $CK_0$, the second clock signal $CK_{90}$, the third clock signal $CK_{180}$, and the fourth clock signal $CK_{270}$.

The driver quarter circuits 211-214 each include an output connected to the output pad 216 by way of the output resistor 215. Including the output resistor 215 can aid in achieving a desired output impedance match, for instance, 50 Ohms or other desired output impedance value.

In the illustrated embodiment, the first driver quarter circuit 211 includes a first driver PFET 221, a first driver NFET 222, a first pull-up predriver circuit 223 for controlling the first driver PFET 221, and a first pull-down predriver circuit 224 for controlling the first driver NFET 222. Additionally, the second driver quarter circuit 212 includes a second driver PFET 231, a second driver NFET 232, a second pull-up predriver circuit 233 for controlling the second driver PFET 231, and a second pull-down predriver circuit 234 for controlling the second driver NFET 232. Furthermore, the third driver quarter circuit 213 includes a third driver PFET 241, a third driver NFET 242, a third pull-up predriver circuit 243 for controlling the third driver PFET 241, and a third pull-down predriver circuit 244 for controlling the third driver NFET 242. Additionally, the fourth driver quarter circuit 214 includes a fourth driver PFET 251, a fourth driver NFET 252, a fourth pull-up predriver circuit 253 for controlling the fourth driver PFET 251, and a fourth pull-down predriver circuit 254 for controlling the fourth driver NFET 252.

The multiplexing driver 260 is advantageously implemented with multiplexing in predriver stages, thereby allowing a connection to the output pad 216 that goes through a low number of transistors. For example, as shown in FIG. 6, each of the driver quarter circuits 211-214 can drive the output pad 216 to $V_{DD}$ or ground ($V_{SS}$) through a single transistor. Accordingly, timing constraints are relaxed by eliminating a multiplexer (for instance, a T-gate multiplexer in cascade with a driver inverter) from the output resistance path.

Figure 7A:
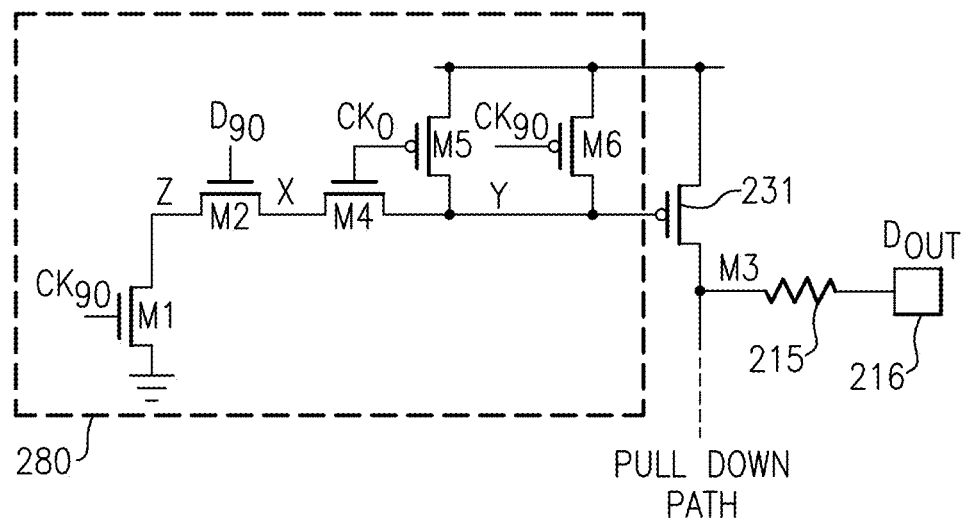
FIG. 7A is a schematic diagram of one embodiment of a pull-up predriver circuit for a multiplexing driver.
Figure 7B:
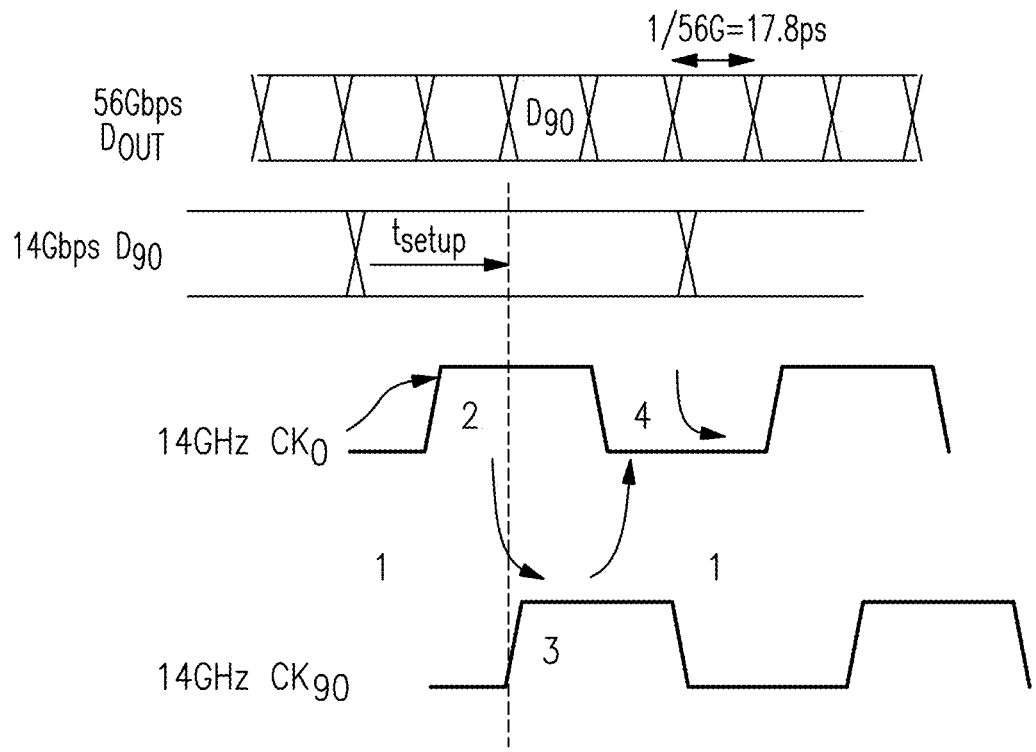
FIG. 7B is one example of a timing diagram for the pull-up predriver circuit of FIG. 7A.

FIG. 7A is a schematic diagram of one embodiment of a pull-up predriver circuit 280 for a multiplexing driver. FIG. 7B is one example of a timing diagram for the pull-up predriver circuit 280 of FIG. 7A.

The pull-up predriver circuit 280 of FIG. 7A illustrates one embodiment of the pull-up predriver circuit 233 of FIG. 6, and thus the pull-up predriver circuit 280 can be included as part of a driver quarter circuit. As shown in FIG. 7A, connections of the pull-up predriver circuit 280 to the second driver PFET 231 (also referred to as driver PFET M3), the output resistor 215, and the output pad 216 are depicted.

In the illustrated embodiment, the pull-up predriver circuit 280 includes a first multiplexing NFET M1, a data NFET M2, a second multiplexing NFET M4, a first pre-charge PFET M5, and a second pre-charge PFET M6.

As shown in FIG. 7A, the pull-up predriver circuit 280 controls activation of the driver PFET M3 at a node Y that is pre-charged to $V_{DD}$ by the first pre-charge PFET M5 when the first clock signal $CK_0$ is low and by the second pre-charge PFET M6 when the second clock signal $CK_{90}$ is low. The node Z is pulled low in response to the second clock signal $CK_{90}$ going high, and the data NFET M2 pulls the node X to ground when the data stream $D_{90}$ is also high. The value of node X is passed to node Y through the second multiplexing NFET M4, which is controlled by the first clock signal $CK_0$.

Thus, the pull-up predriver circuit 280 operates in multiple circuit phases. Table 2 below provides a summary of operation of the pull-up predriver circuit 280 over the phases.

TABLE 2

| Phase | $CK_0$ | $CK_{90}$ | $D_{90}$ | node Y | M4 | M1 |
|---|---|---|---|---|---|---|
| 1 | Low | low | settling after transition | pre-charge to $V_{DD}$ (M5 + M6) | off | off |
| 2 | High | low | finishing settling | pre-charge to $V_{DD}$ | on | off |

TABLE 2-continued

| Phase | $CK_0$ | $CK_{90}$ | $D_{90}$ | node Y | M4 | M1 |
|---|---|---|---|---|---|---|
| 3 | high | high | no change | (M6) pull-down if $D_{90}$ = 1 | on | on |
| 4 | Low | high | no change | pre-charge to $V_{DD}$ (M5) | off | on |

The multi-phase circuit sequence is also graphically depicted in FIG. 7B.

The pull-up predriver circuit 280 of FIG. 7A advantageously includes the fourth phase to turn-off the data NFET M4 and pre-charge node Y quickly (for example, as quickly as CK0 drops below the threshold voltage of the first pre-charge PFET M5) rather than waiting for the whole transistor sequence M1, M2, and M4 to turn off (in order).

Moreover, this pre-charge scheme provides fast performance time and/or low parasitic capacitance while avoiding a need for a separate pre-charge transistor for node X (for instance an additional transistor directly connected between $V_{DD}$ and node X).

Figure 8A:
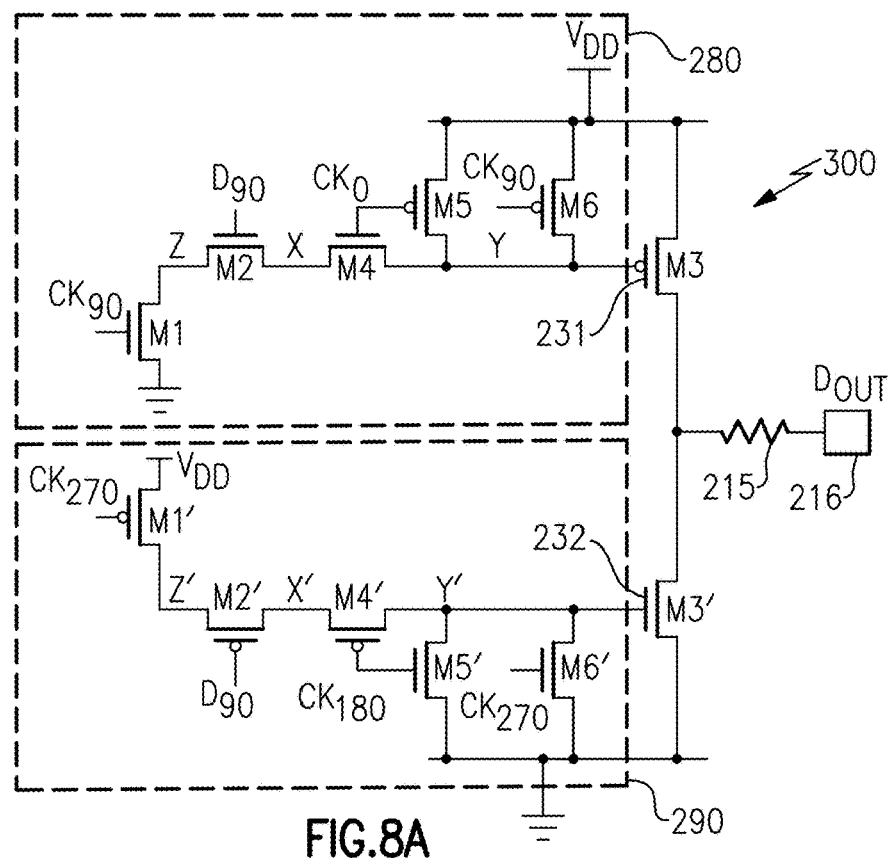
FIG. 8A is a schematic diagram of one embodiment of a driver quarter circuit for a multiplexing driver.
Figure 8B:
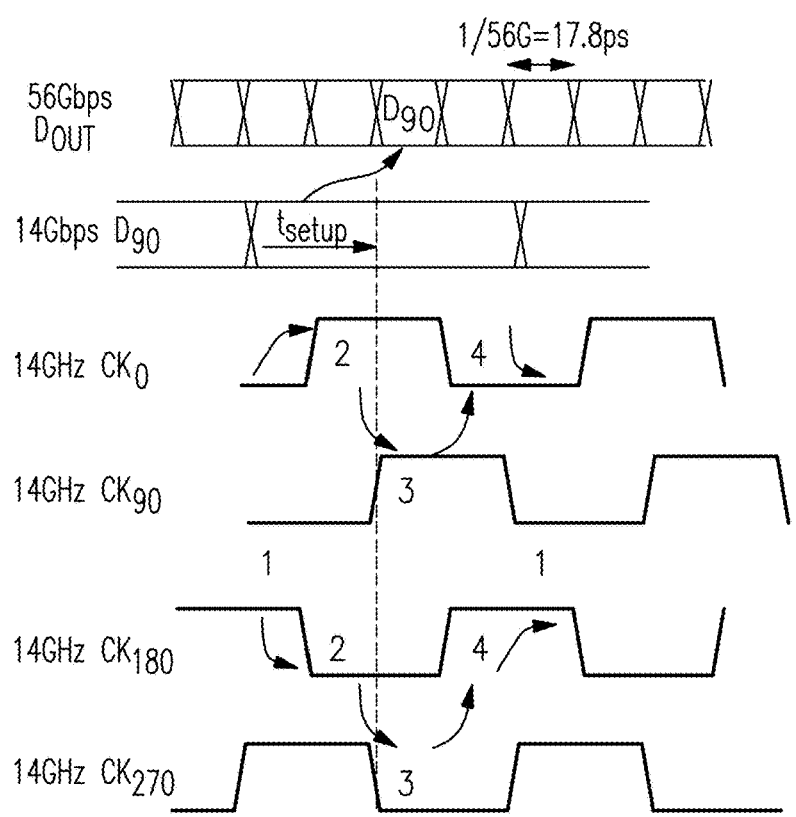
FIG. 8B is one example of a timing diagram for the driver quarter circuit of FIG. 8A.

FIG. 8A is a schematic diagram of one embodiment of a driver quarter circuit 300 for a multiplexing driver. FIG. 8B is one example of a timing diagram for the driver quarter circuit 300 of FIG. 8A for operation at 56 Gbps.

The driver quarter circuit 300 is depicted with connections to the output resistor 215 and the output pad 216. The driver quarter circuit 300 includes a driver PFET 231 (also referred to as driver PFET M3), a driver NFET 232 (also referred to as driver NFET M3'), a pull-up predriver circuit 280, and a pull-down predriver circuit 290.

The driver quarter circuit 300 is implemented with predriver circuits implemented in accordance with the embodiment of FIG. 7A. For example, the driver quarter circuit 300 includes the pull-up predriver circuit 280 as discussed above with reference to FIG. 7A, as well as the pull-down predriver circuit 290 which corresponds to a complementary version of the pull-up predriver circuit 280 in which transistor polarities and power supply connections are reversed and the clock signals are delayed by 180 degrees to provide inversion.

As shown in FIG. 8A, the pull-down predriver circuit 290 includes a first multiplexing PFET M1' (controlled by $CK_{270}$ and connected between $V_{DD}$ and node Z'), a data PFET M2' (controlled by $D_{90}$ and connected between node Z' and node X'), a second multiplexing PFET M4' (controlled by $CK_{180}$ and connected between node X' and node Y'), a first pre-charge NFET M5' (controlled by $CK_{180}$ and connected between node Y' and ground), and a second pre-charge NFET M6' (controlled by $CK_{270}$ and connected between node Y' and ground).

The multi-phase circuit sequence of the driver quarter circuit 300 of FIG. 8A is graphically depicted in FIG. 8B.

Drivers with Controllable Output Swing and Constant Output Impedance

In certain applications, such as SerDes, it is desirable for an output driver to have constant output impedance while at the same time having controllable output swing to achieve desired signal amplitude. For example, implementing a driver with variable output amplitude control allows for enhanced flexibility for achieving desired signal level. However, it is desirable for the change in output amplitude or swing to not degrade performance by changing the output impedance from a desired level.

Although current mode logic (CML) drivers can realize controllable swing and constant output impedance, CML drivers suffer from a number of undesirable characteristics, such as high power consumption. Series source transistor (SST) drivers offer improved power performance, but suffer from varying output impedance when the driver transistor size is changed to adjust output amplitude.

SST drivers with controllable output swing and constant output impedance are provided. In certain embodiments herein, a controllable driver includes a group of differential SST driver slices that are connected in parallel with one another to drive a pair of output terminals providing a differential output signal, and a group of attenuator slices that are connected in parallel with one another across the pair of output terminals. Each attenuator slice can be implemented to have an on-state resistance about equal to an on-state resistance of one of the differential SST driver slices. Additionally, the controllable driver includes a control circuit that activates an attenuator slice for each SST driver slice that is decommissioned to provide amplitude control. Thus, for every differential SST driver slice that is disabled for amplitude control, an attenuator slice is enabled.

Thus, the combined total number of active SST driver slices and active attenuator slices remains constant, and the output impedance remains at a desired value (for instance, 50 Ohms).

In certain implementations, the control circuit can be implemented to also disable any clock and data path circuits used to drive a differential SST driver slice that is disabled for amplitude control. By implementing the controllable driver in this manner, any additional current draw by the attenuator array is outweighed by a current reduction arising from disabling the clock and data path circuits leading to the decommissioned slices.

Figure 9:
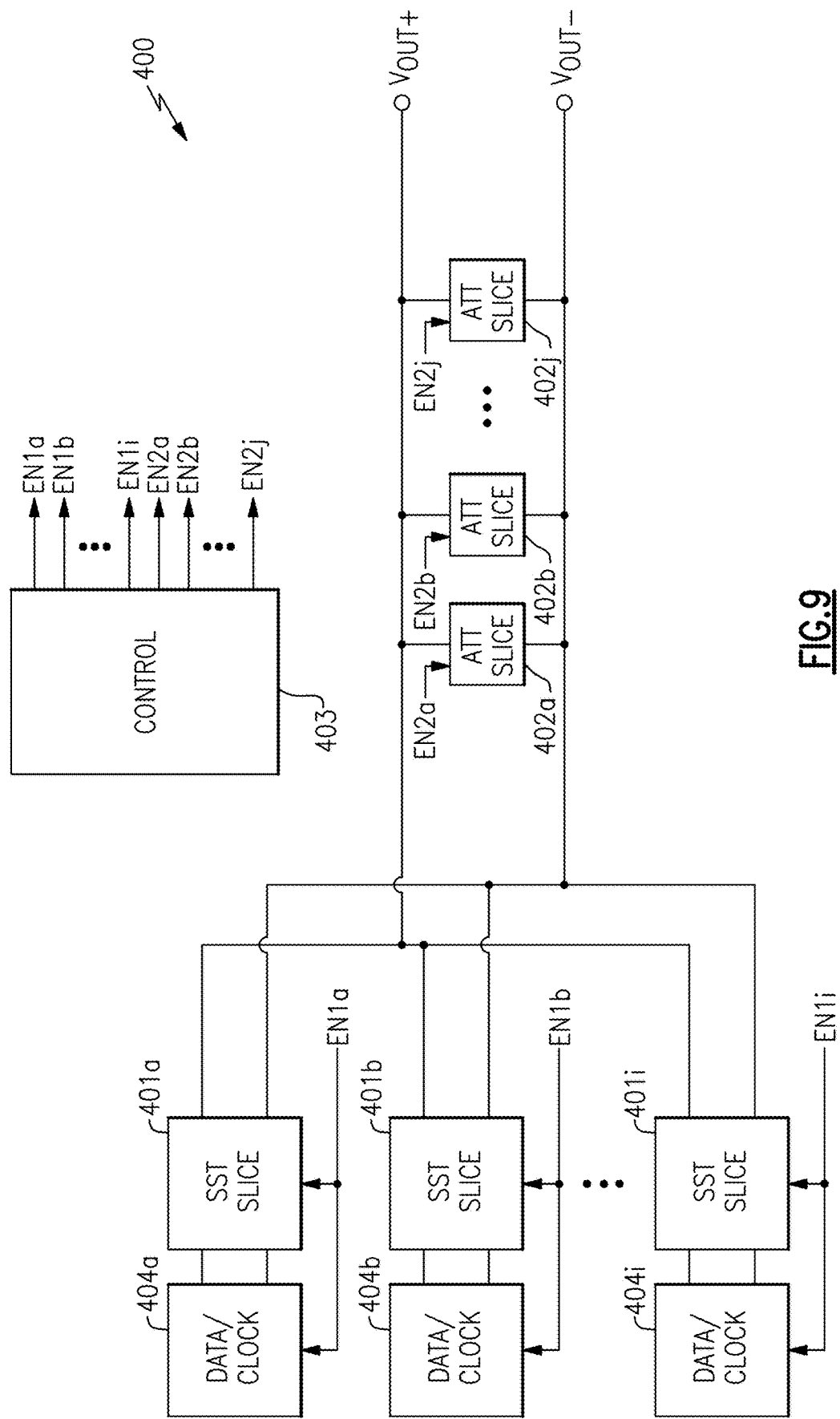
FIG. 9 is a schematic diagram of one embodiment of a driver with controllable swing and constant output impedance.

FIG. 9 is a schematic diagram of one embodiment of a driver 400 with controllable swing and constant output impedance. The driver 400 includes differential SST slices 401a, 401b, . . . 401i operating in parallel with one another to drive a pair of output terminals $V_{OUT+}/V_{OUT-}$. The driver 400 further includes attenuator slices 402a, 402b, . . . 402j in parallel with one another across the pair of differential output terminals $V_{OUT+}$, $V_{OUT-}$. The driver 400 further includes a control circuit 403 and data/clock path slices 404a, 404b, . . . 404i.

In the illustrated embodiment, the control circuit 403 generates a first group of enable signals EN1a, EN1b, . . . EN1i for enabling the SST slices 401a, 401b, . . . 401i, respectively. Additionally, the control circuit 403 generates a second group of enable signals EN2a, EN2b, . . . EN2j for enabling the attenuator slices 402a, 402b, . . . 402j, respectively. The number of SST slices i and the number of attenuator slices j can be the same or different. The control circuit 403 maintains a total number of active SST driver slices and active attenuator slices constant. Thus, for every differential SST driver slice that is disabled for amplitude control, an attenuator slice is enabled.

In certain implementations, each attenuator slice is implemented to have an on-state resistance about equal to an on-state resistance of one of the differential SST driver slices. For example, when operating at room temperature and nominal operating voltage, the on-state resistances can be within 20% of one another, or more particularly within 5%, for example, within 1%. Thus, the resistances of the attenuator slices and differential SST driver slices need not match exactly.

Although the attenuator slices and SST resistances can be implemented to be about equal in resistance, other implementations are possible. For example, making the attenuator resistance greater can provide increased amplitude control granularity.

In certain implementations, resistance tuning of the SST slices and/or attenuator slices can be provided to provide compensation for variation, for example, process, supply voltage, and/or temperature (PVT) variation.

Additionally or alternatively, the layouts and/or design topologies of the slices can be implemented such that the resistances of the SST slices and attenuator slices track each other to account for variation arising from manufacturing and/or operating conditions.

When the on-state resistances are about equal and the combined total number of active SST driver slices and active attenuator slices remains constant, the output impedance across attenuation settings remains constant at a desired value (for instance, 50 Ohms).

In certain implementations, the control circuit 403 can be implemented to also disable any clock and data path circuits used to drive a differential SST driver slice that is disabled for amplitude control. For example, in the illustrated embodiment, the data/clock path slices 404a, 404b, . . . 404i also receive the enable signals EN1a, EN1b, . . . EN1i.

Figure 10A:
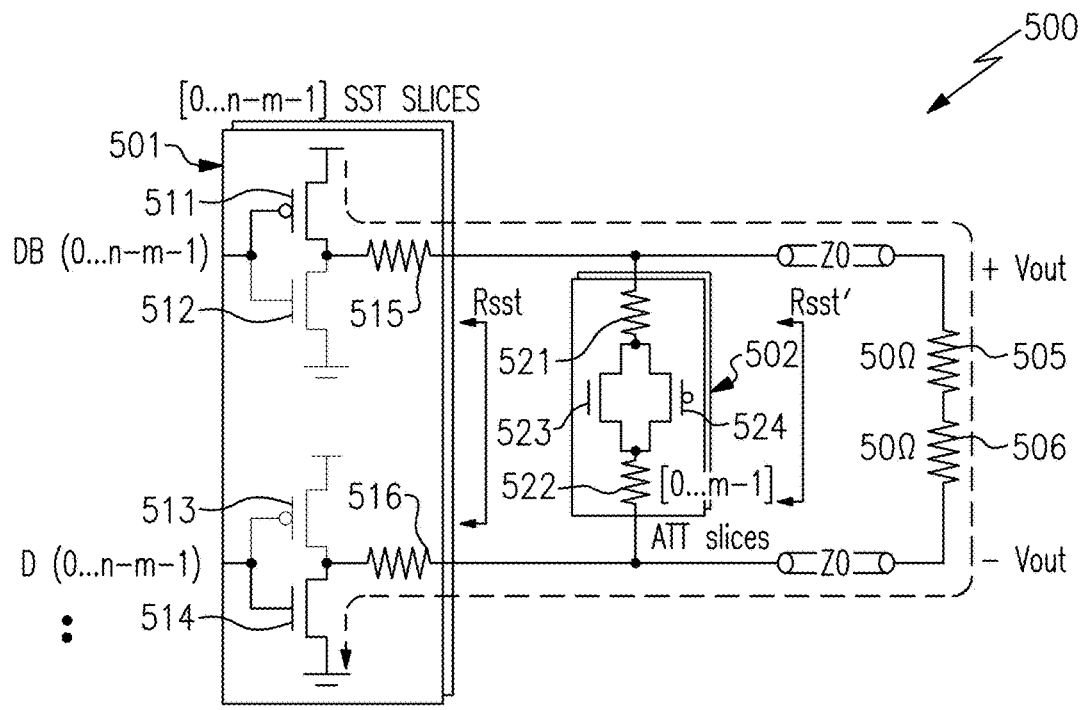
FIG. 10A is a schematic diagram of another embodiment of a driver with controllable swing and constant output impedance.

FIG. 10A is a schematic diagram of another embodiment of a driver 500 with controllable swing and constant output impedance.

The driver 500 is depicted as including [0 . . . n−m−1] number of active SST slices 501 and corresponding data signals D and inverted data signals DB. Each of the SST slices 501 includes a first driver PFET 511, a first driver NFET 512, a second driver PFET 513, a second driver NFET 514, a first output resistor 515, and a second output resistor 516. The SST slices 501 have an output resistance Rsst. The SST slices 501 drive a pair of output terminals (to generate a differential output voltage +Vout/−Vout) between which a first 50 Ohm load resistor 505 and a second 50 Ohm load resistor 506 are connected.

With continuing reference to FIG. 10A, the driver 500 is depicted with [0 . . . m−1] number of active attenuator slices 502 connected differentially across the pair of output terminals. Each of the attenuator slices 502 includes a first resistor 521, a second resistor 522, and a T-gate multiplexer includes an NFET 523 and a PFET 524. The attenuator slices have an output resistance Rsst'.

In this embodiment, n represents the number of SST slices desired for nominal amplitude at 50 Ohm, and m is the number of decommissioned SST slices/activated attenuator slices.

Figure 10B:
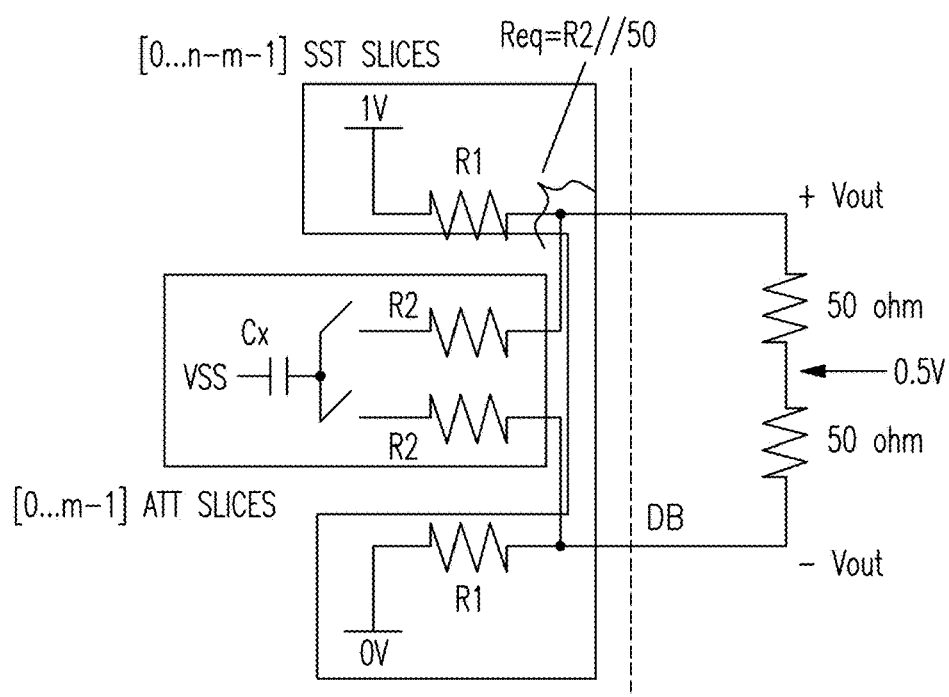
FIG. 10B is a circuit diagram of a portion of the driver of FIG. 10A.

FIG. 10B is a circuit diagram of a portion of the driver 500 of FIG. 10A. The circuit diagram depicts a pair of resistors of resistance R1 representing a transistor resistance of the SST slices. Additionally, the circuit diagram depicts a capacitor of capacitance Cx (which can included for any of the differential drivers herein for common mode termination) and a pair of resistors of resistance R2 representing the resistance of the attenuator slices. The diagram is annotated for a supply voltage ($V_{DD}$) of 1V and a ground voltage of 0V.

In this circuit, the differential output voltage ($V_{OUT+}-V_{OUT-}$) of the driver is equal to $V_{DD}*(R2||50\ Ohm)/((R2||50\ Ohm)+R1)$.

Figure 11:
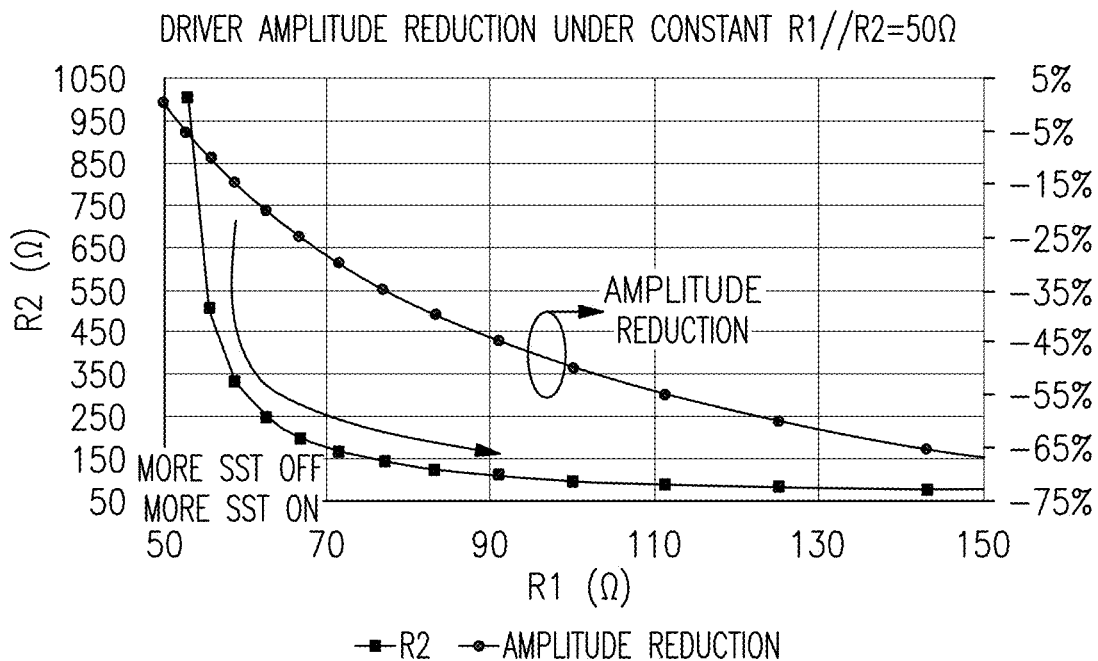
FIG. 11 is a graph of one example of driver amplitude reduction versus attenuation setting for the driver of FIGS. 10A and 10B.

FIG. 11 is a graph of one example of driver amplitude reduction versus attenuation setting for the driver 500 of FIGS. 10A and 10B. The x-axis represents the number of decommissioned SST slices and corresponding amplitude reduction. The output impedance is maintained at 50 Ohm across amplitude control settings.

Figure 12A:
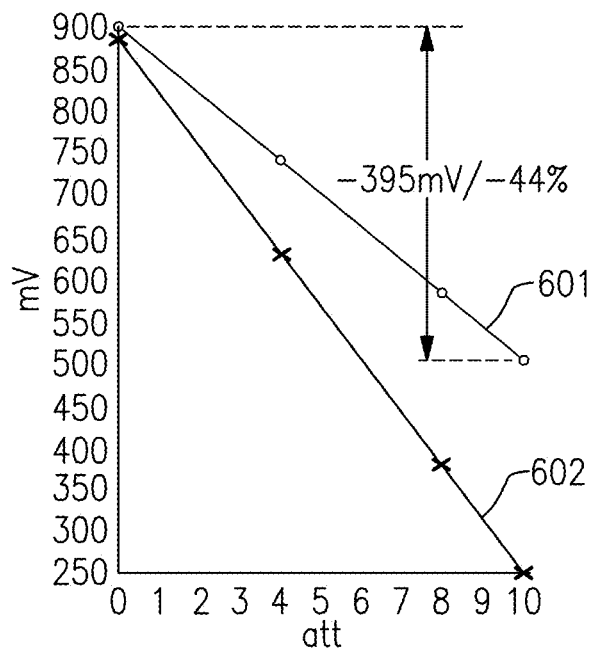
FIG. 12A is a graph of one example comparison of driver output swing versus attenuation setting for two implementations of drivers.

FIG. 12A is a graph of one example comparison of driver output swing versus attenuation setting for two implementations of drivers. The graph includes a plot 601 for one implementation of the driver 500 of FIGS. 10A and 10B, and a second plot 602 for an array of selectable SST slices without any attenuator slices.

Figure 12B:
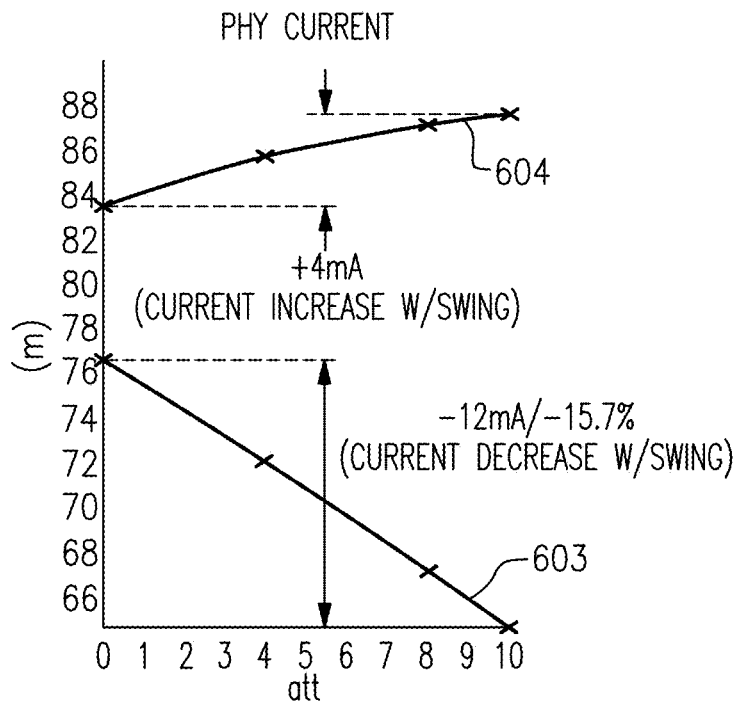
FIG. 12B is a graph of one example comparison of driver current versus attenuation setting for two implementations of drivers.

FIG. 12B is a graph of one example comparison of driver current versus attenuation setting for two implementations of drivers. The graph includes a plot 603 for one implementation of the driver 500 of FIGS. 10A and 10B, and a second plot 604 for an array of selectable SST slices without any attenuator slices.

Figure 12C:
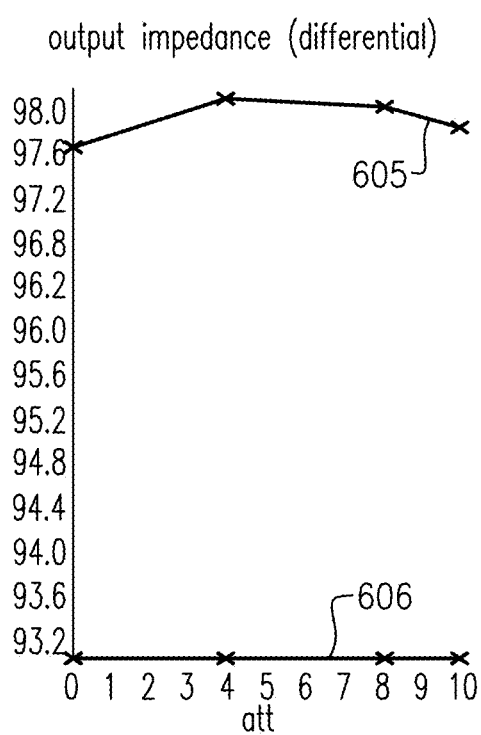
FIG. 12C is a graph of one example comparison of driver output impedance versus attenuation setting for two implementations of drivers.

FIG. 12C is a graph of one example comparison of driver output impedance versus attenuation setting for two implementations of drivers. The graph includes a plot 605 for one implementation of the driver 500 of FIGS. 10A and 10B, and a second plot 606 for an array of selectable SST slices without any attenuator slices.

With reference to FIGS. 12A to 12C, the total of SST slices and attenuator slices is selected to be 24 for the implementation of the driver 500. Additionally, a 100 Ohm differential resistance is simulated. The results show a linear tradeoff between 1V AVDD current reduction and smaller swing.

Moreover, with respect to FIG. 12A, the attenuation plot 601 follows FIG. 11 as expected while the attenuation plot 602 follows a more linear trend due to a different attenuation method. Additionally, the current plot 604 of FIG. 12B sees current increase as front-end stages (slices 404a, 404b, . . . 404i and slices 401a, 401b, . . . 401i in FIG. 9) are still active while the attenuation plot 602 of FIG. 12A also induces additional cross-bar current within the output driver stage. Furthermore, with respect to FIG. 12C, the lower value of output impedance plot 606 is due to the 24 slices used in the simulation instead of 23 which would have increased the value by 4.3% (equal to 1/23) to 97.25 Ohm to match the output impedance plot 605 closer.

Figure 13:
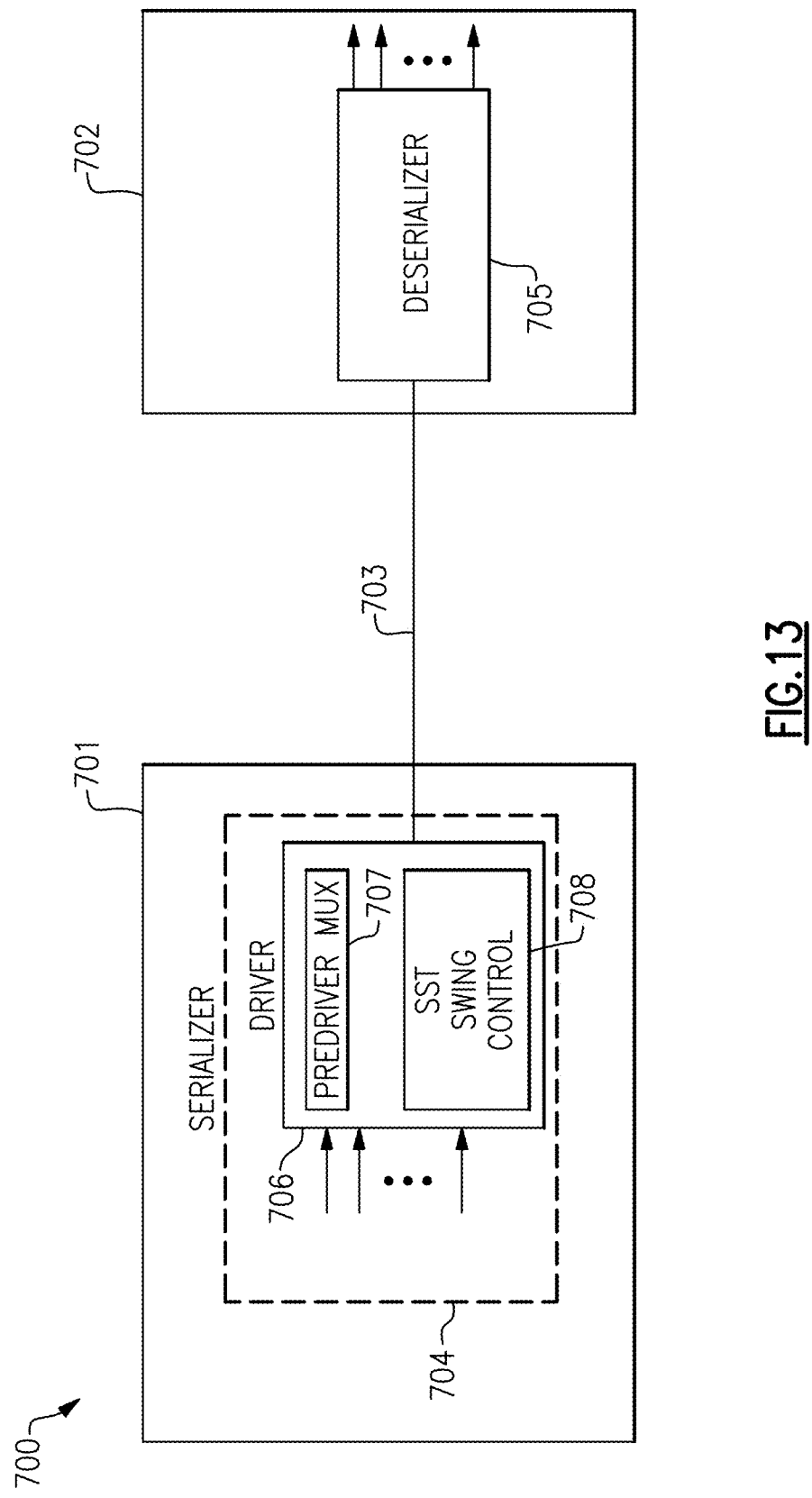
FIG. 13 is a schematic diagram of one embodiment of a SerDes system.

FIG. 13 is a schematic diagram of one embodiment of a SerDes system 700. The SerDes system 700 includes a first semiconductor die 701 and a second semiconductor die 702 connected over a high-speed link 703, which can be, for example, a pair of differential conductors.

The first semiconductor die 701 includes a serializer 704 that receives two or more incoming data streams of reduced bit rate relative to a high-speed data stream provided on the high-speed link 703. The second semiconductor die 702 includes a deserializer 705 that generates two or more outgoing data streams of reduced bit rate based on the high-speed data stream received from the serializer 704.

The serializer 704 includes a driver 706 implemented in accordance with one or more features of the present disclosure. For example, the driver 706 can include predriver circuitry 707 that provides multiplexing of the incoming data streams and/or can include SST swing control 708 using attenuator slices for output impedance control in accordance with the teachings herein.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A driver circuit comprising:
an output terminal configured to provide an output data stream; and
a first driver subcircuit configured to receive a first input data stream of a lower bit rate than the output data stream, and to drive the output terminal based on the first input data stream in response to a transition of a first clock signal;
wherein the first driver subcircuit comprises a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor,
wherein the first driver transistor is a driver p-type field effect transistor (PFET) and the second driver transistor is a driver n-type field effect transistor (NFET), wherein the first pull-up predriver circuit comprises a data NFET controlled by the first input data stream and connected between a first node and the low supply voltage, a multiplexing NFET controlled by the first clock signal and connected between the first node and a second node coupled to a gate of the driver PFET, and a pre-charge PFET controlled by the first clock signal and connected between the high supply voltage and the second node.

2. The driver circuit of claim 1 wherein the first pull-up predriver circuit further comprises a data PFET controlled by the first input data stream and connected between the high supply voltage and the first node.

3. The driver circuit of claim 2 wherein the first pull-up predriver circuit operates in a first phase in which the first input data stream sets a voltage of the first node and the second node is pre-charged, and a second phase in which the voltage of the first node is transferred to the second node.

4. A driver circuit comprising:
an output terminal configured to provide an output data stream; and
a first driver subcircuit configured to receive a first input data stream of a lower bit rate than the output data stream, and to drive the output terminal based on the first input data stream in response to a transition of a first clock signal;
wherein the first driver subcircuit comprises a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor,
wherein the first driver transistor is a driver p-type field effect transistor (PFET) and the second driver transistor is a driver n-type field effect transistor (NFET), wherein the first pull-up predriver circuit comprises a first multiplexing NFET controlled by the first clock signal and connected between a first node and a second node coupled to a gate of the driver PFET, a first pre-charge PFET controlled by the first clock signal and connected between the high supply voltage and the second node, and a second pre-charge PFET controlled by a second clock signal and connected between the high supply voltage and the second node, wherein the second clock signal is offset in phase from the first clock signal.

5. The driver circuit of claim 4 wherein the first pull-up predriver circuit further comprises a data NFET controlled by the first input data stream and connected between the first node and a third node, and a second multiplexing NFET controlled by the second clock signal and connected between the third node and the low supply voltage.

6. The driver circuit of claim 1 further comprising a second driver subcircuit configured to receive a second input data stream of the lower bit rate and to drive the output terminal in response to a transition of a second clock signal that is offset in phase from the first clock signal.

7. The driver circuit of claim 6 further comprising a third driver subcircuit configured to receive a third input data stream of the lower bit rate and to drive the output terminal in response to a transition of a third clock signal, and a fourth driver subcircuit configured to receive a fourth input data stream of the lower bit rate and to drive the output terminal in response to transition of a fourth clock signal, wherein the first clock signal, the second clock signal, the third clock signal, and the fourth clock are offset in phase from one another.

8. The driver circuit of claim 1 further comprising an output resistor connected between the output terminal and an output of the first driver subcircuit.

9. The driver circuit of claim 1 wherein the transition of the first clock signal is a rising edge.

10. A serializer/deserializer (SerDes) system comprising:
a deserializer; and
a serializer comprising a driver including an output terminal configured to provide an output data stream to the deserializer, and a first driver subcircuit configured to receive a first input data stream of a lower bit rate than the output data stream, and to drive the output terminal based on the first input data stream in response to a transition of a first clock signal,
wherein the first driver subcircuit comprises a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor,
wherein the first driver transistor is a driver p-type field effect transistor (PFET) and the second driver transistor is a driver n-type field effect transistor (NFET), wherein the first pull-up predriver circuit comprises a data NFET controlled by the first input data stream and connected between a first node and the low supply voltage, a multiplexing NFET controlled by the first clock signal and connected between the first node and a second node coupled to a gate of the driver PFET, and a pre-charge PFET controlled by the first clock signal and connected between the high supply voltage and the second node.

11. The SerDes system of claim 10 wherein the first pull-up predriver circuit further comprises a data PFET controlled by the first input data stream and connected between the high supply voltage and the first node.

12. The SerDes system of claim 11 wherein the first pull-up predriver circuit operates in a first phase in which the first input data stream sets a voltage of the first node and the second node is pre-charged, and a second phase in which the voltage of the first node is transferred to the second node.

13. A serializer/deserializer (SerDes) system comprising:
a deserializer; and
a serializer comprising a driver including an output terminal configured to provide an output data stream to the deserializer, and a first driver subcircuit configured to receive a first input data stream of a lower bit rate than the output data stream, and to drive the output terminal based on the first input data stream in response to a transition of a first clock signal,
wherein the first driver subcircuit comprises a first driver transistor connected between a high supply voltage and the output terminal with no other transistors therebetween, a second driver transistor connected between a low supply voltage and the output terminal with no other transistors therebetween, a first pull-up predriver circuit configured to control the first driver transistor, and a first pull-down predriver configured to control the second driver transistor,
wherein the first driver transistor is a driver p-type field effect transistor (PFET) and the second driver transistor is a driver n-type field effect transistor (NFET), wherein the first pull-up predriver circuit comprises a first multiplexing NFET controlled by the first clock signal and connected between a first node and a second node coupled to a gate of the driver PFET, a first pre-charge PFET controlled by the first clock signal and connected between the high supply voltage and the second node, and a second pre-charge PFET controlled by a second clock signal and connected between the high supply voltage and the second node, wherein the second clock signal is offset in phase from the first clock signal.

14. The SerDes system of claim 13 wherein the first pull-up predriver circuit further comprises a data NFET controlled by the first input data stream and connected between the first node and a third node, and a second multiplexing NFET controlled by the second clock signal and connected between the third node and the low supply voltage.

15. The SerDes system of claim 13 wherein the transition of the first clock signal is a rising edge.

16. The SerDes system of claim 10 wherein the transition of the first clock signal is a rising edge.

17. The driver circuit of claim 4 further comprising a second driver subcircuit configured to receive a second input data stream of the lower bit rate and to drive the output terminal in response to a transition of a second clock signal that is offset in phase from the first clock signal.

18. The driver circuit of claim 17 further comprising a third driver subcircuit configured to receive a third input data stream of the lower bit rate and to drive the output terminal in response to a transition of a third clock signal, and a fourth driver subcircuit configured to receive a fourth input data stream of the lower bit rate and to drive the output terminal in response to transition of a fourth clock signal, wherein the first clock signal, the second clock signal, the third clock signal, and the fourth clock are offset in phase from one another.

19. The driver circuit of claim 4 further comprising an output resistor connected between the output terminal and an output of the first driver subcircuit.

20. The driver circuit of claim 4 wherein the transition of the first clock signal is a rising edge.

* * * * *